US012546850B1

(12) United States Patent
Miller et al.

(10) Patent No.: US 12,546,850 B1
(45) Date of Patent: Feb. 10, 2026

(54) SYSTEMS AND METHODS FOR ADAPTIVE SIGNAL PROCESSING

(71) Applicant: EPIRUS, INC., Hawthorne, CA (US)

(72) Inventors: Tyler Edward Miller, Redondo Beach, CA (US); Michael Thomas Ho, Torrance, CA (US); Son Hong Doan, Westminster, CA (US); Christopher Hyongsok Min, Fullerton, CA (US)

(73) Assignee: EPIRUS, INC., Torrance, CA (US)

( * ) Notice: Subject to any disclaimer, the term of this patent is extended or adjusted under 35 U.S.C. 154(b) by 279 days.

(21) Appl. No.: 18/359,354

(22) Filed: Jul. 26, 2023

Related U.S. Application Data

(60) Provisional application No. 63/369,495, filed on Jul. 26, 2022.

(51) Int. Cl.
*G01S 7/02* (2006.01)
*G01S 13/02* (2006.01)
*G01S 13/68* (2006.01)

(52) U.S. Cl.
CPC .............. *G01S 7/021* (2013.01); *G01S 13/68* (2013.01); *G01S 2013/0245* (2013.01)

(58) Field of Classification Search
None
See application file for complete search history.

(56) References Cited

U.S. PATENT DOCUMENTS

| 11,211,703 | B2 | 12/2021 | Marr et al. | |
|---|---|---|---|---|
| 11,616,295 | B2 | 3/2023 | Marr et al. | |
| 11,658,410 | B2 | 5/2023 | So et al. | |
| 11,677,145 | B1* | 6/2023 | Sharma | H01Q 3/2682 |
| | | | | 342/372 |
| 2013/0171946 | A1* | 7/2013 | Veihl | H01Q 21/26 |
| | | | | 455/73 |
| 2016/0128023 | A1* | 5/2016 | Gustavsson | H04W 72/02 |
| | | | | 370/329 |

* cited by examiner

Primary Examiner — Ladimir Magloire
Assistant Examiner — Anna K. Gosling
(74) Attorney, Agent, or Firm — Knobbe, Martens, Olson & Bear, LLP

(57) ABSTRACT

A system may include a first sub-array of transceivers comprising a plurality of transmitters and receivers. A system may include a second sub-array of transceivers comprising a plurality of transmitters and receivers. A system may include a first processing electronics circuit configured to process one or more signals received by the first sub-array of transceivers. A system may include a second processing electronics circuit configured to process the signals received by the second sub-array of transceivers. A system may include a central processing system in communication with the first and second processing electronics modules.

15 Claims, 11 Drawing Sheets

SYSTEMS AND METHODS FOR ADAPTIVE SIGNAL PROCESSING

CROSS-REFERENCE TO RELATED APPLICATIONS

This application claims the benefit of priority to U.S. Provisional Patent Application No. 63/369,495, filed on Jul. 26, 2022, the contents of which are incorporated herein by reference.

TECHNICAL FIELD

This disclosure relates to systems and method to phased array system and applying adaptive processing to the distributed phase array systems.

BACKGROUND

Emerging jamming systems pose substantial threat to both communications and radar systems for current and future threat engagements. These threat systems can be rapidly deployed and reconfigured to adapt and counter existing systems, without hardware modifications and across extremely wide operational bandwidths. Furthermore, inexpensive software defined radios have increased accessibility and availability of jamming capabilities to our adversaries.

To counter these threats traditional systems have adapted a variety post processing adaptive signal processing techniques which are limited by hardware architectures, data throughput, and processing timelines.

SUMMARY

Various embodiments described herein comprise distributed adaptive phase arrays employing distributed adaptive signal processing to enhance the performance of digital phase array architectures while decreasing the amount of data transferred throughout the system. While present adaptive processing techniques rely on central processing, the novel aspects described herein can advantageously parallelize operations while maintaining performance. The adaptive processing techniques described herein can be utilized at scale with significantly reduced data throughput and centralized processing requirements. The embodiments described herein comprise distributed, adaptive, and/or dimensionality reduction techniques that leverage unsupervised machine learning algorithms to achieve performance metrics better than or similar to central, element-level adaptive processing via a distributed approach that efficiently scales for large arrays. Current methods of dimensionality reduction for large arrays is done in the central processing system. In the embodiments disclosed herein, the dimensionality reduction is performed by a distributed processor that is remote from a central processor which advantageously reduces processing complexity and amount of data throughput requirements at the central processor. In various embodiments, distributed pre-processing of data is employed to enable rapid adaptability and computationally efficient signal processing. Traditionally, processing is done by a single central processing system, which pushes the limits on size, weight and power (SWaP) to meet latency requirements. The architectures described herein can perform many processing steps in parallel, across smaller, distributed processors thereby providing rapid adaptability to intelligent threats with minimal latency and without sacrificing system performance.

In some aspects, the techniques described herein relate to a phased array system including: a first sub-array of transceivers including a plurality of transmitters and receivers; a second sub-array of transceivers including a plurality of transmitters and receivers; a first processing electronics circuit configured to process one or more signals received by the first sub-array of transceivers; a second processing electronics circuit configured to process the signals received by the second sub-array of transceivers; and a central processing system in communication with the first and second processing electronics modules.

In some aspects, the techniques described herein relate to a phased array system, wherein the first and second processing electronic circuits are configured to share data between each other.

In some aspects, the techniques described herein relate to a phased array system, wherein the first and second processing electronic circuits include a field programmable gate array (FPGA) or an application specific integrated circuit (ASIC).

In some aspects, the techniques described herein relate to a phased array system, wherein the central processing system includes an electronic central processing unit (CPU) or an electronic graphics processing unit (GPU).

In some aspects, the techniques described herein relate to a phased array system, wherein a size of the first sub-array or a size of the second array is variable and dynamically determined.

In some aspects, the techniques described herein relate to a phased array system, wherein the first electronic processing circuit is configured to compute a first partial auxiliary beam based on the signals received by the first sub-array of transceivers, and the second electronic processing circuit is configured to compute a second partial auxiliary beam based on the signals received by the second sub-array of transceivers, wherein the central processing system is configured to compute a total auxiliary beam based on the first partial auxiliary beam and the second partial auxiliary beam.

In some aspects, the techniques described herein relate to a phased array system, wherein the total auxiliary beam includes information regarding location of an interference source.

In some aspects, the techniques described herein relate to an electronic receiver array including: a first sub-array of receiving electronic configured to receive radiofrequency (RF) signals from an antenna and digitize the received RF signals; a second sub-array of receiving electronic configured to receive radiofrequency (RF) signals from an antenna and digitize the received RF signals; a first processing electronics circuit configured to process the signals output from the first sub-array; a second processing electronics circuit configured to process the signals output from the second sub-array; and a central processing system in communication with the first and second processing electronics circuits, wherein the first processing electronics circuit is configured to calculate a first adaptive partial auxiliary beam from the signals from the first sub-array, wherein the second processing electronics circuit is configured to calculate a second adaptive partial auxiliary beam from the signals from the second sub-array, and wherein the central processing system is configured to calculate a full auxiliary beam for the electronic receiver array from the first partial auxiliary beam and the second partial auxiliary beam.

In some aspects, the techniques described herein relate to an electronic receiver, wherein the first processing electronics circuit is further configured to calculate the first partial auxiliary beam by estimating an angle of arrival of signal from an interference source.

In some aspects, the techniques described herein relate to an electronic receiver, wherein the second processing electronics circuit is further configured to calculate the second partial auxiliary beam by estimating an angle of arrival of signal from an interference source.

In some aspects, the techniques described herein relate to an electronic receiver, wherein the first and second adaptive auxiliary partial beams are calculated using principal component analysis.

In some aspects, the techniques described herein relate to an electronic receiver array including: a first sub-array of receiving electronic configured to receive radiofrequency (RF) signals from a first antenna array and digitize the received RF signals; a second sub-array of receiving electronic configured to receive radiofrequency (RF) signals from a second antenna array and digitize the received RF signals; a first processing electronics circuit configured to process the signals output from the first sub-array; a second processing electronics circuit configured to process the signals output from the second sub-array; and a central processing system in communication with the first and second processing electronics circuits, wherein the first processing electronics circuit is configured to generate a first spatial covariance matrix, the first spatial covariance matrix including a measured portion calculated using signals received from the first sub-array and an inferred portion calculated using estimates of angle of arrival of signals from one or more interference source, the first processing electronics circuit further configured to compute a first auxiliary beam weight and calculate a first partial auxiliary beam based on the signals received from the first sub-array and the first auxiliary beam weight, wherein the second processing electronics circuit is configured to generate a second spatial covariance matrix, the second spatial covariance matrix including a measured portion calculated using signals received from the second sub-array and an inferred portion calculated using estimates of angle of arrival of signals from one or more interference source, the second processing electronics circuit further configured to compute a second auxiliary beam weight and calculate a second partial auxiliary beam based on the signals received from the second sub-array and the second auxiliary beam weight, and wherein the central processing system is configured to calculate a total auxiliary beam for the electronic receiver array from the first auxiliary partial beam and the second auxiliary partial beam.

In some aspects, the techniques described herein relate to an electronic receiver, wherein the angle of arrival of signals from the one or more interference source is obtained using a sub-space angle estimation approach.

In some aspects, the techniques described herein relate to an electronic receiver, wherein the inferred portion includes a signal to noise ratio for the one or more interference sources.

In some aspects, the techniques described herein relate to a method of processing signals received by an electronic receiver array, the method including: receiving radiofrequency (RF) signals at a first antenna array, the first antenna array including a plurality of antenna elements; digitizing the received RF signals at a first receiver sub-array including a plurality of electronic receivers; receiving radiofrequency (RF) signals at a second antenna array, the second antenna array including a plurality of antenna elements; digitizing the received RF signals at a second receiver sub-array including a plurality of electronic receivers; calculating a first spatial covariance matrix using a first processing electronics circuit configured to process the signals output from the first receiver sub-array; calculating a first partial auxiliary beam based on the first spatial covariance matrix using the first processing electronics circuit; calculating a second spatial covariance matrix using a second processing electronics circuit configured to process the signals output from the second receiver sub-array; calculating a second partial auxiliary beam based on the second spatial covariance matrix using the second processing electronics circuit; and calculating a total auxiliary beam for the electronic receiver array from the first auxiliary partial beam and the second auxiliary partial beam using a central processing system in communication with the first and second processing electronics circuits.

In some aspects, the techniques described herein relate to a method, wherein calculating the first spatial covariance matrix includes calculating a measured portion using signals received from the first receiver sub-array and calculating an inferred portion using estimates of angle of arrival of signals from one or more interference source.

In some aspects, the techniques described herein relate to a method, wherein calculating the second spatial covariance matrix includes calculating a measured portion using signals received from the second receiver sub-array and calculating an inferred portion using estimates of angle of arrival of signals from one or more interference source.

In some aspects, the techniques described herein relate to a method, wherein calculating the first partial auxiliary beam includes computing a first auxiliary beam weight using the first processing electronics circuit and calculating the first partial auxiliary beam based on the signals received from the first receiver sub-array and the first auxiliary beam weight.

In some aspects, the techniques described herein relate to a method, wherein calculating the second partial auxiliary beam includes computing a second auxiliary beam weight using the second processing electronics circuit and calculating the second partial auxiliary beam based on the signals received from the second receiver sub-array and the second auxiliary beam weight.

BRIEF DESCRIPTION OF THE FIGURES

The disclosure is more fully appreciated in connection with the following detailed description taken in conjunction with the accompanying drawings, in which:

FIGS. 1C, 1D and 1E illustrate examples of traditional transmission and receiving (T/R) module architecture in comparison to the multi-input multi output (MIMO) architecture of distributed phased array system.

Like reference numerals refer to corresponding parts throughout the several views of the drawings.

DETAILED DESCRIPTION

Multifunction system designs are advantageous to the support of increasingly complex missions that require using a single set of hardware to accomplish multiple disperse objectives via software controllable configurations and settings. For example, a multifunction phased array system can be employed to simultaneously function as a radar and provide wide area electronic support measure (ESM) at multiple frequencies. To provide flexibility and adaptability that multifunction systems require, these system designs trend toward fully digital arrays, where every element is independently controlled and digitized. Multifunction systems can also benefit from the use of adaptive signal processing techniques. Many of the adaptive signal processing techniques may require $O(N^3)$ operations, and thus may not scale well for very large, fully digital arrays where N may be thousands of elements. The subject matter of this disclosure considers distributed processing approaches that maintain the flexibility of fully digital arrays, while reducing the data throughputs and processing requirements by orders of magnitude as compared to existing centralized processing approaches. The approach described herein can also enable new capabilities like distributed resource management, where each distributed processing board (DPB) can dynamically allocate resources based on the current threat environment, and either send the minimum amount of data necessary to maintain performance, or re-allocate existing resources to perform multiple simultaneous functions, such as ESM with radar.

The present disclosure provides distributed adaptive phase arrays which employs distributed signal processing to enhance the array performance while decreasing the amount of data transferred throughout the system. Methods and architectures to efficiently perform adaptive array processing in a distributed manner across the system are disclosed herein. The disclosed architectures and signal processing techniques allow element and sub-array digitization to: (1) reduce data transfer across the system, (2) reduce processing complexity at the central processing system, (3) maintain performance in a high interference environment, and (4) reduce overall size, weight, and power requirements to enable application to smaller, more agile platforms. Furthermore, the disclosed systems and methods can improve system reliability, adaptability, and reconfigurability to counter the next generation of jamming threats.

Figure 1:
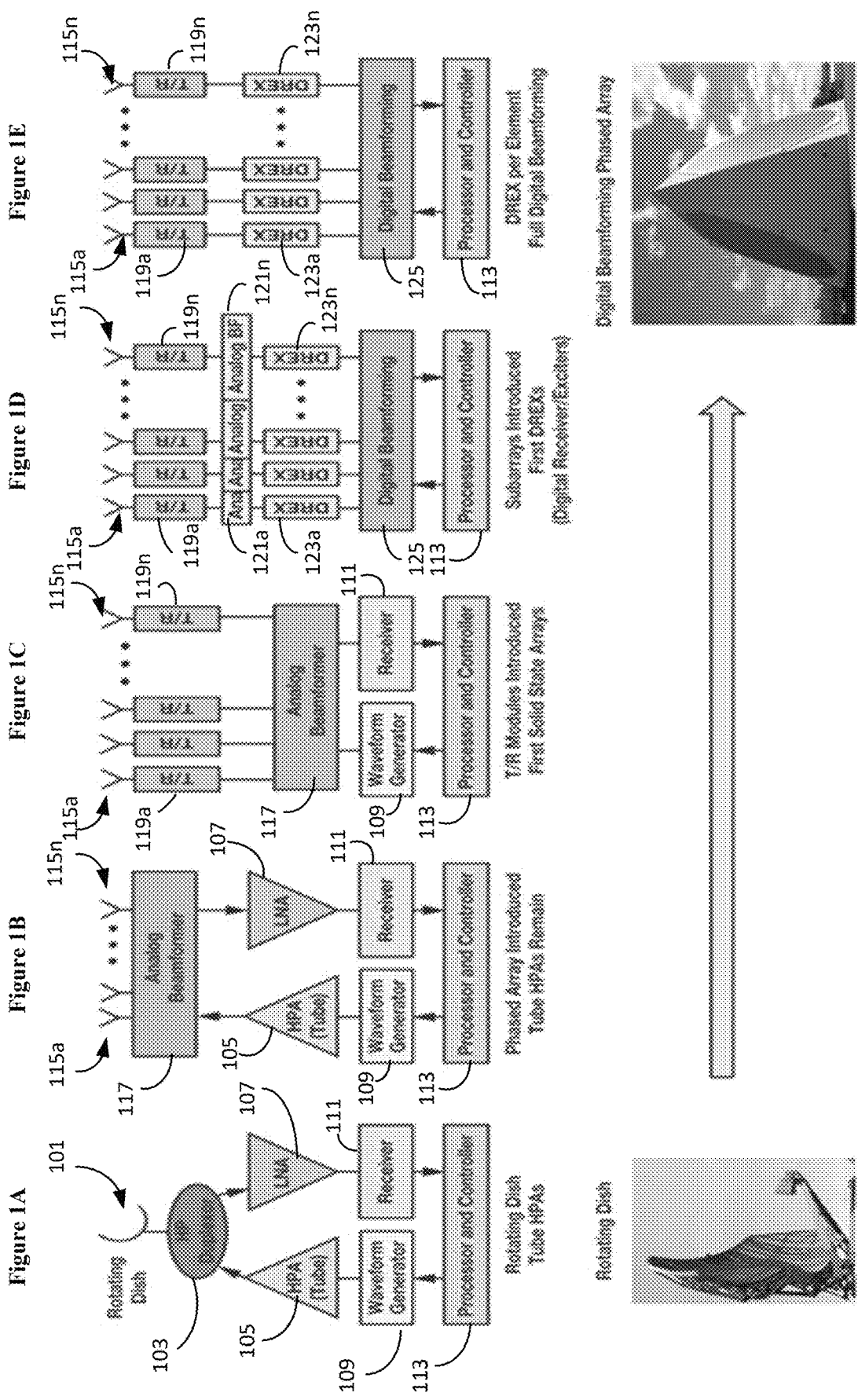
FIGS. 1A, 1B, 1C, 1D, and 1E, illustrate chronological advance in adaptive phase array antennas.

FIGS. 1A, 1B, 1C, 1D, and 1E, illustrate chronological advances in adaptive phase array antennas. FIGS. 1A and 1B illustrate implementations of an older, legacy systems that employ separate transmit and receive chains with single high-power amplifiers (HPAs) 105 and low noise amplifiers (LNAs) 107. The HPA 105 comprise tube amplifiers. FIG. 1A employs a rotating dish 101 as an antenna element. A duplexer 103 allows the separate transmit and receive chains to share the rotating dish 101. The system of FIG. 1A comprises a waveform generator 109 connected to the high-power amplifier 105 in the transmit path and an electronic receiver 111 connected to the low noise amplifier 107. A central processing system 113 comprising hardware electronic processors is used to process the received data and control various components of the system. Without any loss of generality, the central processing system 113 can comprise field programmable gate arrays (FPGAs), general purpose processor (GPP), graphics processing unit (GPU) or any combination thereof. With evolution of antenna technology, the rotating dish 101 and the duplexer 103 is replaced by an antenna array comprising antenna elements 115a, ..., 115n and an analog beamformer 117 comprising analog phase shifters as depicted in the system of FIG. 1B.

FIG. 1C illustrates the introduction of transmit/receive (T/R) modules 119a, ..., 119n which provide amplifiers at every antenna element of the antenna array. This T/R module architecture can be found in many sustainment systems. FIG. 1D illustrates a progression in digital technology, for example, individual Digital Receiver Exciters (DREXs) 123a, ..., 123n are employed to distribute the waveform generation and receiver capabilities across the array. The system of FIG. 1D also employs an array of analog beamformers 121a, ..., 121n instead of a single analog beamformer 117. A digital beamformer 125 comprising one or more digital phase shifters is employed to perform digital beamforming. Many next generation systems employ this architecture. FIG. 1E illustrates the current state of the art (as depicted in the rightmost diagram), which is a fully digital array with individual T/R modules 119a, ..., 119n and DREXs 123a, ..., 123n at each antenna element 115a, ..., 115n. This architecture enables scalable multi-input multi output (MIMO) solutions. However, this all-digital architecture employs a single, central processing system 113 which, due to data-rate capabilities, may impose restrictions on adaptive processing techniques, especially as the array expands to thousands of elements or more.

Many previous and current system include modular array designs that utilize highly efficient techniques for frontend signal conditioning, high speed data transfers and distributed, non-adaptive signal processing. However, these techniques can lead to data and processing overload when every element is collecting high bandwidth data across a very large array. The embodiments disclosed herein enhance system performance by including a distributed, adaptive processing capability for very large, fully digital at-every-element arrays. A novel, distributed processing architecture, along with advanced signal processing algorithms, is described herein to intelligently reduce the amount of data going to a central processing system 113 without compromising on functionality or performance. This simultaneously improves system reliability, adaptability, and reconfigurability to counter the next generation of jamming threats. An illustration of this distributed processing architecture is shown in FIG. 2.

Figure 2:
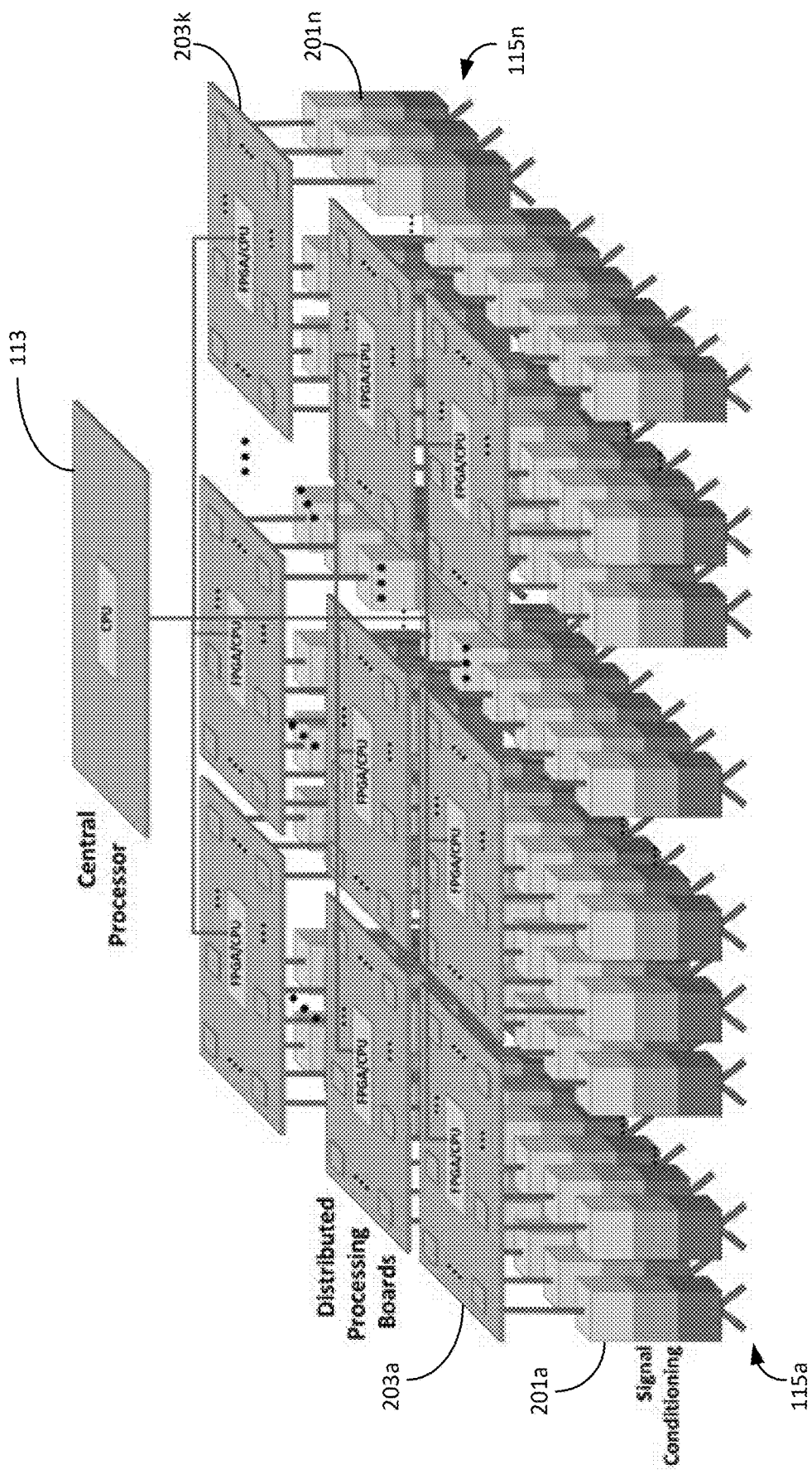
FIG. 2 illustrates an implementation of a distributed processing architecture.

FIG. 2 illustrates an electronic transceiver system comprises antenna elements 115a, ..., 115n arranged in a 2-dimensional array. Each antenna element 115a, ..., 115n is associated with a signal conditioning unit (SCU) 201a, ..., 201n. Each signal conditioning unit can comprise amplifiers, phase shifters, analog-to-digital converters (ADCs), transceiver (T/R) module, etc. The system further comprises a plurality of distributed processing boards (DPBs) 203a, ..., 203k configured to execute a distributed processing algorithm to process the data received by the antenna elements. The distributed processing boards 203a, ..., 203k can comprise one or more of field programmable gate arrays (FPGAs), application specific integrated circuit (ASICs), electronic processing circuits, power circuits, electronic memories, etc. A plurality of signal conditioning units may be electronically connected to a distributed processing board such that the number of distributed processing boards can be lesser than the number of antenna elements and/or the number of signal conditioning units. The data from the distributed processing boards (DPBs) 203a, ..., 203k can be transferred to a central processing system 113 comprising electronic circuits for further processing. The system illustrated in FIG. 2 can be implemented as an electronic detection and ranging system (e.g., a radar).

The distributed processing boards are capable of performing real-time processing of the received data. The introduction of distributed processing boards enables novel, distributed, adaptive processing and a corresponding increase in resource management and control within each board. The distributed processing architecture illustrated in FIG. 2 provides significant reductions in data throughput requirements, a decrease in the complexity of the central processing system 113, and enhanced performance via adaptive mitigation of interference in hostile environments which allows arrays to effectively scale to much larger sizes.

The system of FIG. 2 employs fully digital arrays for rapid reactivity and reconfigurability. Fully reconfigurable array assignments allow full flexibility in designing simultaneous multi-function capabilities at the most granular level which advantageously provides expanded multi-function capabilities, enabling each system to accept more task assignments during every mission.

The use of novel distributed algorithms for interference mitigation in the system of FIG. 2 allow the distributed processors to apply the best adaptive processing algorithm to maximize SINR (Signal to Interference & Noise Ratio) for each collection event. The distributed processors allow the system to leverage improved speed of parallelization while maintaining performance of fully centralized approaches. These features allow the system to detect more targets than other comparable systems in hostile environments that are full of interference sources.

The system of FIG. 2 can employ unsupervised machine learning (e.g., principal component analysis (PCA)) for smart beam formation and reduced data rates. This can advantageously reduce the amount of input data that is provided to the central processing system 113. In some implementations, the input data is less than most round robin approaches and without the added latency. Fewer digital connections; simplified system architecture with lower SWAP-C (Size, Weight, Power and Cost)

Since the distributed processing boards can be employed to do bulk of the processing, the amount of pre-processed data provided to the central processing system 113 can be reduced. This can simplify the amount of processing executed by the central processing system 113. Accordingly, the distributed processing architecture can advantageously reduce the complexity of the central processing system 113 thereby reducing size, weight, power and cost (SWaP-C) of the central processing system 113 and also reducing latency.

The system of FIG. 2 provides array scalability via modular design. The distributed processing architecture advantageously provides a modular approach to scaling array size. For example, the complexity of the central processing system 113 scales linearly with size as opposed to cubic increase demonstrated with many comparable system architectures. Accordingly, the modular design of the system of FIG. 2 improves scalability to tens or hundreds of thousands of digital elements.

The system of FIG. 2 is capable of dynamic resource management. Each distributed processor adaptively responds to current interference environment to autonomously manage resources across each function which leads to a faster reaction time to threats. The system of FIG. 2 is capable of extracting more actionable information while using the same total amount of system resources.

The architectures and systems disclosed herein provide distributed processing to enhance array performance while decreasing the amount of data transferring throughout the system. Distributed processing may take place on-array to support Multiple-Input Multiple-Output (MIMO) configurations, or the same techniques can be applied to a distributed network of arrays to support multi-static configurations. The disclosure provides and compares several novel approaches to distributed processing of phased arrays and attempts to optimize the performance of various approaches.

Adaptive array processing, though inherently a computationally heavy procedure, is an effective means for improving receiver performance. It provides an effective means of nulling out interference, including both clutter and jammers, without any degradation due to array calibration errors. It is a useful component for most MIMO applications and many other use cases that may require multiple, simultaneous, and varying beams. Reducing the computational load of performing adaptive processing can be advantageous in utilizing these techniques, especially for systems that employ larger arrays and have constraints on size, weight and power (SWaP) requirements, such as those used for aerial or space applications.

The computational complexity of current state of the art technologies for processing an adaptive phased array scales with the cube of the number of samples, N, in the training input vector $\bar{x}$. Without any loss of generality, N is related to the spatial size of the array but may also include contributions from other dimensions (time, frequency, polarization, etc.). This is because the techniques require the inversion of the N×N covariance matrix, R, which is formed by taking an outer product of the training input vector $\bar{x}$ with itself. This inverse covariance matrix is then multiplied by the desired steering vector $\bar{d}$ to create the set of adaptive weights, which when multiplied by the sample vector $\hat{x}$, results in the desired adaptive output, y. Equations (1) and (2) below mathematically describe the above method:

$$R = E\{xx^T\} = E\left\{\begin{bmatrix} |x|^2 & \cdots & x_1 x_N^T \\ \vdots & \ddots & \vdots \\ * & \cdots & |x_N|^2 \end{bmatrix}\right\} \quad (1)$$

$$y = (R^{-1}d)^H \hat{x} \quad (2)$$

With applications requiring arrays with thousands of elements in surveillance and ground-based radars, the computational complexity of performing adaptive spatial processing across all these elements quickly becomes unachievable for a standard processor that meets SWAP constraints. Without any loss of generality, taking samples across multiple dimensions can increase the size of the training input vector thereby yielding better performance. However, obtaining samples across multiple dimensions can increase the amount of processing needed to support traditional adaptive processing techniques. For example, advanced processing techniques may utilize 64-spatial channels, with 2-polarizations and 50-time domain samples. For this example, the resulting size of the input vector, N, becomes 64*2*50=6400. Further, this adaptive processing must run for multiple range bins (which may number in the thousands), making the entire process incredibly expensive from a computation perspective. The disclosure provides how to efficiently perform adaptive array processing while maintaining performance. The techniques described herein can also be utilized across other dimensions, such as time, frequency, or polarization.

The path forward employs an innovative concept of performing distributed digital processing instead of relying on traditional approaches that use a single central processing system. Distributed processing allows for parallel processing to reduce the data rates and required size of central processing resources. A well-known example of this is to group elements into subarrays, which can reduce the complexity from $O(N^3)$ to $O(K+K^3)$ where K is the number of subarrays. For an array of N=2048, with K=64, the complexity can be reduced by 5 orders of magnitude. However, this reduction in processing does come with a degradation in the performance of the adaptive process. In the case of nulling interference for example, we will see a reduced signal to noise ratio (SNR). The disclosure provides improvement in computational costs and optimize the distributed processing schemes to reach a beneficial balance of data rates, processing throughput, SNR and other performance metrics (directionality, number of targets, etc.). Having distributed processing that can do matrix inversion provides a huge advantage for calibration. Distributed processing allows for calibration in parallel within each subarray, instead of passing all the data to a single processor. This can allow multiple channels to calibrate at the same time, instead of having to calibrate each channel in sequence (for example, due to data rate limits going to a single processor).

Figures 3A, 3B, 3C, 3D:
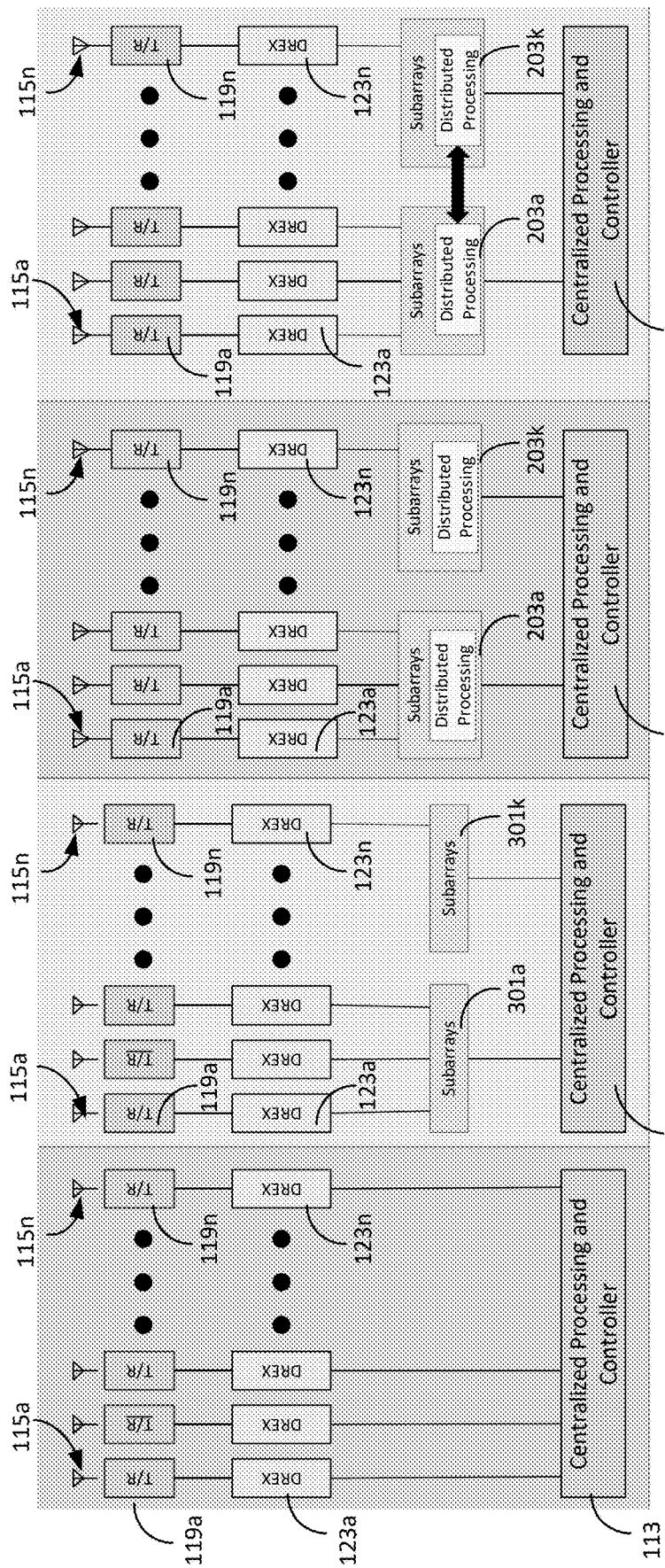
FIGS. 3A, 3B, 3C, and 3D illustrate the various implementations of central and distributed adaptive beamforming with subarrays.

In order to implement many distributed processing techniques, the availability of specific type of processing resources is important. FIGS. 3A, 3B, 3C, and 3D illustrate the various implementations of central and distributed adaptive beamforming with subarrays. More particularly, FIG. 3A illustrates a baseline architectural approach to which FIGS. 3B-3D can be compared. Furthermore, FIGS. 3C and 3D illustrate the addition of distributed processing approach added to FIG. 3B. FIGS. 3A and 3B represent current state-of-the-art technologies, which is either a fully digital approach where every element is digitized and sent to a central processing system 113 (shown in FIG. 3A), or a subarray approach where the frontend of the system non-adaptively combines elements together in subarrays 301a, . . . , 301k to reduce the dimensionality of the data (shown in FIG. 3B). FIGS. 3C and 3D represent new approaches that provide additional capabilities. The approach shown in FIG. 3C expands upon approach shown in FIG. 3B by using virtual subarrays (e.g., distributed processing boards 203a, . . . , 203k) that are fully software definable and add an adaptive processing capability to intelligently reduce the amount of data. The approach shown in FIG. 3D expands upon this even further by including a direct connection between each virtual subarray (e.g., distributed processing boards 203a, . . . , 203k) to enable data sharing without going back to the central processing unit 113.

Many systems will have FPGAs distributed throughout the system to support a subarray architecture (see, for example, FIG. 3B). However, these FPGAs may not be well suited for the matrix inversion step that many adaptive algorithms require. Instead, a central processing unit (CPU), general purpose processor (GPP), or graphics processing unit (GPU) are preferred for these types of techniques, especially when multiple unique sizes of matrix must be inverted (for example, it is common for the size of the covariance matrix to be unique for each Mode in the system). CPUs and GPUs are traditionally only available in a single, central processor for each system; therefore, the present disclosure provides the advantage of distributing these resources across the system, and even highlight where more specialized approaches like custom ASICs can provide a further advantage. Any recommended technique will thus include what processing resources are required to implement that approach.

The trade-offs of moving from central processing to distributed processing are investigated herein. Distributed processing architecture may require complex inter-array networking and processing for increase/optimal performance. Several different architectures are investigated below.

Architectural approach 1 as shown in FIG. 3A represents a fully digital array where all element level data is available to the central processing system 113. This architectural approach is a baseline to which the others will be compared. Architectural approach 2 shown in FIG. 3B represents the current State of the Art (SOA) subarray architecture, where each element is still fully digital, but subarrays are formed to reduce the amount of data sent to the central processing system 113. Architectural approach 3 shown in FIG. 3C represents a simplified distributed processing approach, where each subarray also performs distributed processing. Lastly, architectural approach 4 shown in FIG. 3D represents a full distributed processing approach, where each subarray not only performs distributed processing, but shares data with the other subarrays. Each of the architectural approaches 2-4 shown in FIGS. 3B-3D are further analyzed to find optimizations that provide a good tradeoff between functional performance on the one hand, and computational complexity and data rates on the other.

Theoretical estimates of the number of computational steps to perform adaptive processing on the corresponding architectures are shown below in Table 1. These estimates are based primarily on the matrix inversion step of each approach and compares the size of the input sample vector that is created for each architectural approach.

TABLE 1

Order of complexity for adaptive processing of phased
array for the approaches 1-4 illustrated in FIG. 3A-3D

| Architectural Approach | Description | Order of complexity | Discussion |
| --- | --- | --- | --- |
| 1 | Centralized adaptive beamforming of entire array | $O(N^3)$ | Complexity resulting from inversion of matrix of size N |

TABLE 1-continued

Order of complexity for adaptive processing of phased
array for the approaches 1-4 illustrated in FIG. 3A-3D

| Architectural Approach | Description | Order of complexity | Discussion |
|---|---|---|---|
| 2 | Centralized, subarray level adaptivity | $O(k + k^3)$ | Processing of an array of k elements |
| 3 | Distributed, Subarray Level adaptivity | $O(k + E(N/k)^3$ | Processing of each subarray which have average size N/k |
| 4 | Distributed, element level adaptivity | $O(N^{2.808})$ or better | |

Naturally, the computational advantages to be gained from the reduction of degrees of freedom through subarrays, will affect performance. In preliminary studies on a small, N=64 array, distributed adaptive processing was simulated and compared the performance of inversion of the full array with that of 16 (non-uniform) subarray inversions. The processing architecture for the two cases are shown in FIGS. 4A and 4B.

Figure 4A:
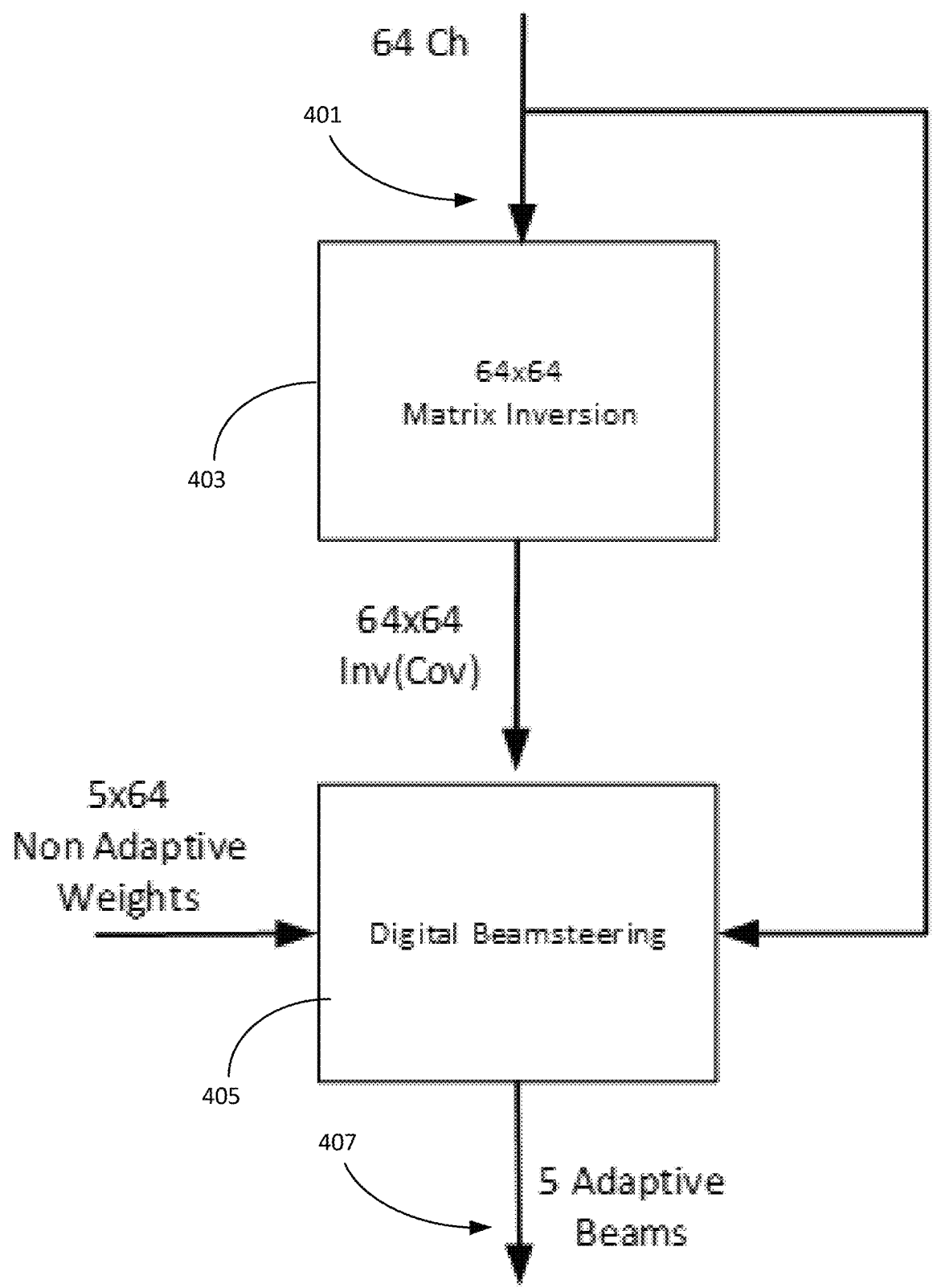
FIGS. 4A and 4B illustrate processing architecture for on-array beamforming.
Figure 4B:
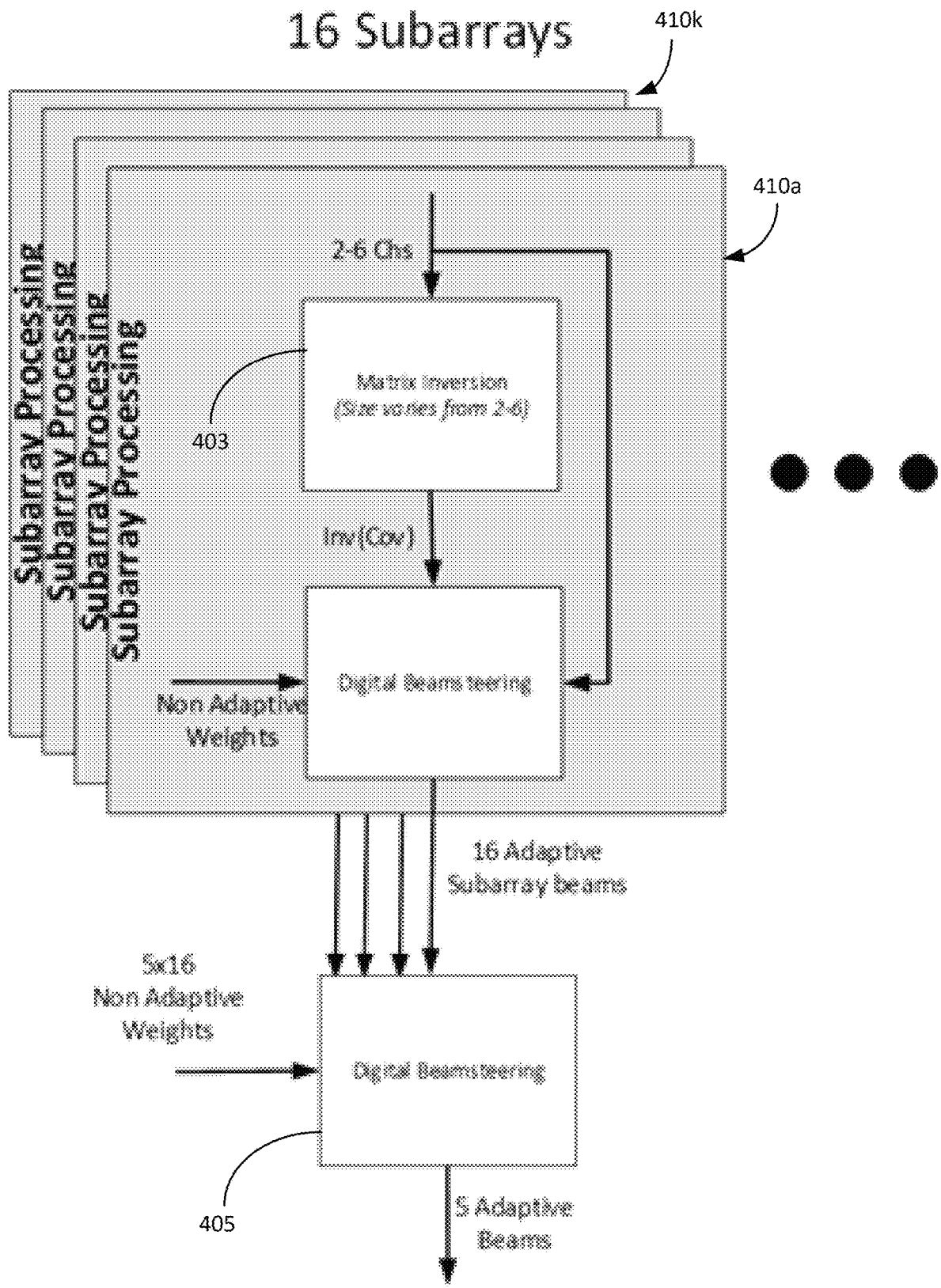

FIGS. 4A and 4B illustrate processing architecture for on-array beamforming. FIG. 4A shows the adaptive processing of full array and FIG. 4B shows the adaptive processing in parallel of each subarray. The subarrays may be of varying sizes. In FIG. 4A, the data stream 401 from the antenna elements of the 64-element array undergoes a 64×64 matrix inversion as shown in block 403. The inverted matrix information is forwarded to a digital beam steering block 405 to which M×64 non-adaptive weights are provided, M being the number of beams. The digital beam steering block 405 outputs M adaptive beams 407. In FIG. 4A, the number of adaptive beams, M is equal to 5. In FIG. 4B, K subarrays 410a, . . . , 410k are employed to do the matrix inversion on incoming data from a subset (e.g., 2-6) of the antenna elements of the 64-element array. K is less than the total number of antenna elements. Digital beam steering is employed in each subarray using a set of non-adaptive weights. K adaptive subarray beams are input to the digital beam steering block 405 to which M×K non-adaptive weights are provided. The digital beam steering block 405 outputs M adaptive beams 407. In FIG. 4B, the number of subarrays K is equal to 16 and the number of adaptive beams 407 output by the digital beam steering block 405 is 5. As compared to FIG. 4A, the digital beam steering block 405 of FIG. 4B does not have to process a 64×64 matrix thereby reducing the processing complexity.

The simulation results implementing the processing architecture of FIGS. 4A and 4B shows that performance is indeed degraded when applying the subarray architecture to the adaptive beamforming.

Figure 6:
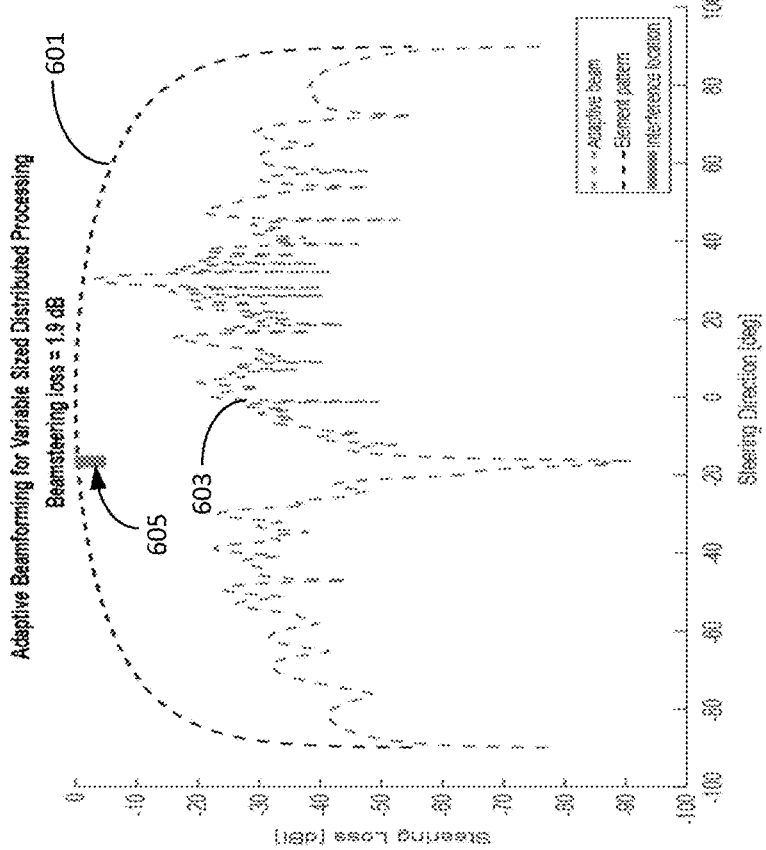
FIGS. 5 and 6 show the beam steering losses corresponding to the architectural approach shown in FIGS. 4A and 4B respectively.
Figure 5:
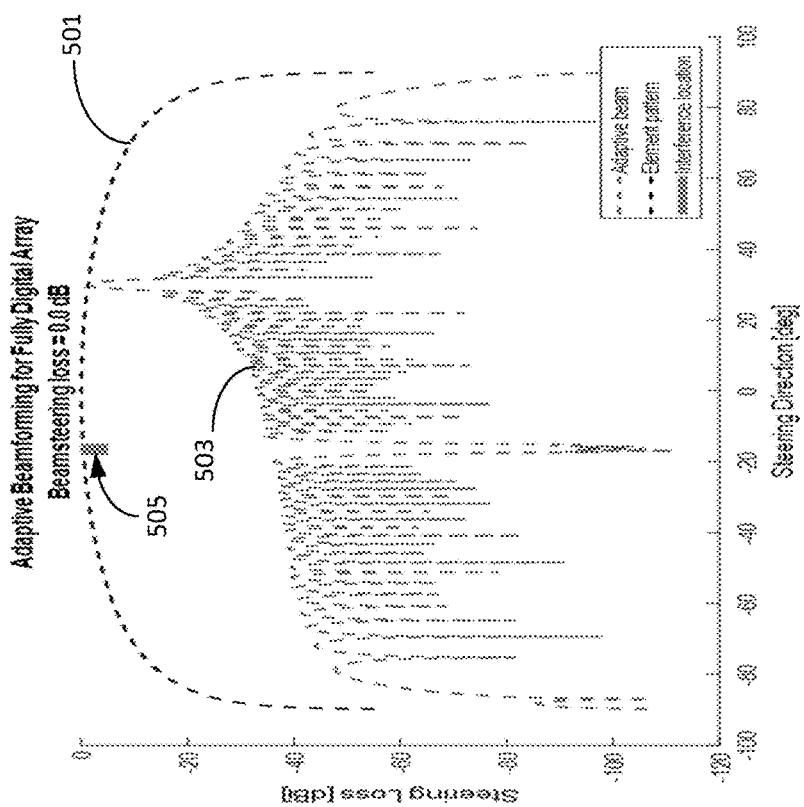

The difference in steering loss in full array (illustrated in FIG. 4A) and sub array architecture (illustrated in FIG. 4B) is further explained with the help of graphical results shown in FIG. 5 and FIG. 6. In FIG. 5, the element pattern is depicted by curve 501, the adaptive beam is depicted by 503 and 505 indicates the location of the interference. As noted, the adaptive beam 503 shows a null in a steering direction corresponding to the location of the interference. In FIG. 6, the element pattern is depicted by curve 601, the adaptive beam is depicted by 603 and 605 indicates the location of the interference. As noted, the adaptive beam 603 shows a null in a steering direction corresponding to the location of the interference. The result shown in FIG. 5 corresponds to the architectural approach shown in FIG. 4A. The result shown in FIG. 6 corresponds to the architectural approach shown in FIG. 4B. From FIG. 5, it is noted that the difference in steering loss in the full array is 0.0 dB, and from FIG. 6, it is noted that the difference in steering loss in the subarray architectures is 1.9 dB. However, the covariance matrix decreases from 64×64 to only 16×16, providing a very significant decrease in processing complexity by two orders of magnitude. This results in an inherent trade-off between performance and computational complexity.

The optimal subarray size must be dynamic, as it depends both on the size of the array (i.e., number of elements) and the rank of the interference. For example, for larger arrays with more degrees of freedom, the same sized subarrays will result in lower losses as there will be more subarrays to run the adaptive processing techniques across. Creating a highly flexible and adaptive simulation can be useful to provide guidelines for how to best design future systems using these techniques.

Figure 7:
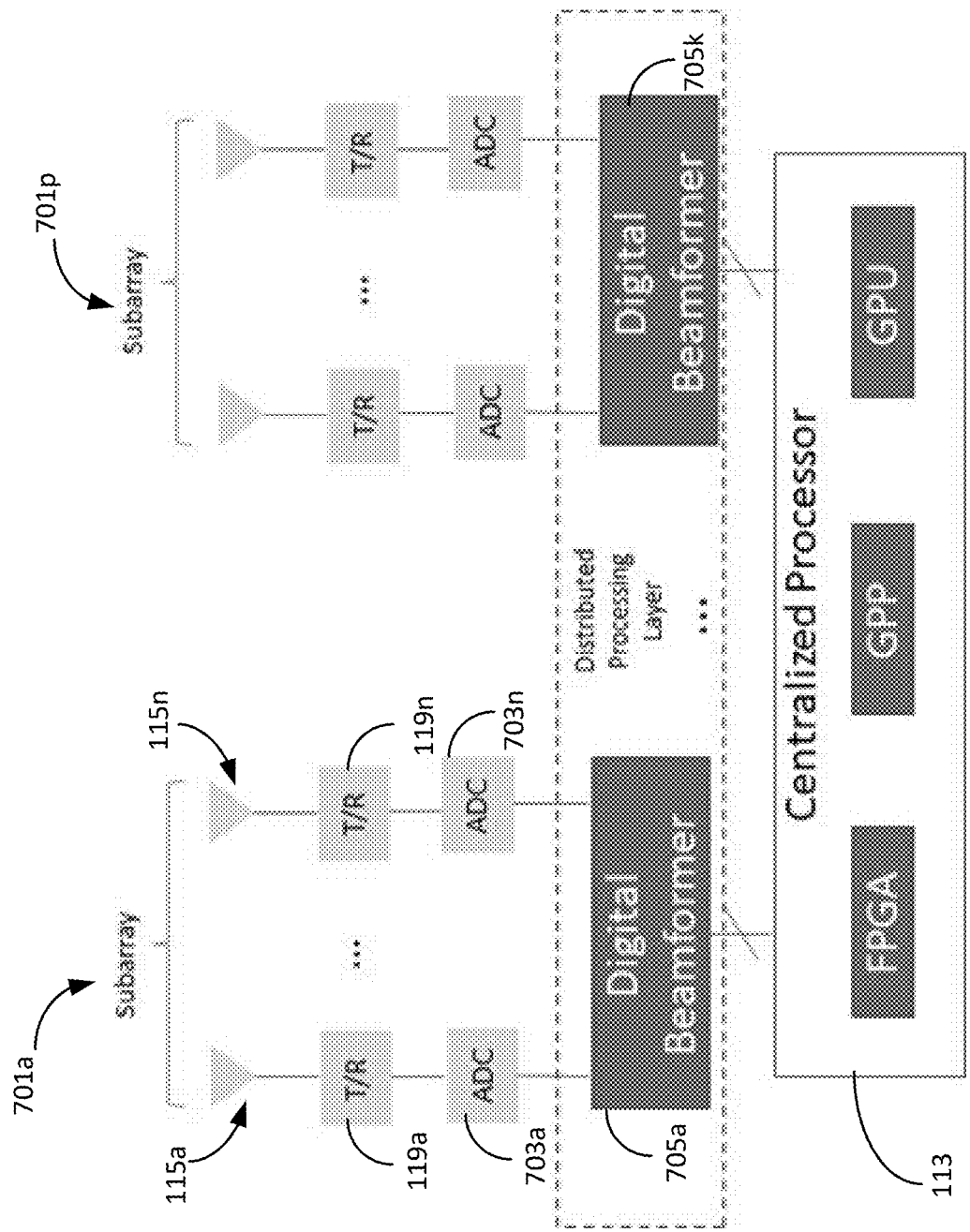
FIG. 7 illustrates an implementation of a distributed adaptive phase array system employing distributed adaptive signal processing.

FIG. 7 illustrates an implementation of a distributed adaptive phase array system employing distributed adaptive signal processing. As discussed above, the distributed processing architecture depicted in FIG. 7 allows for scaling of fully digital processing to large antenna arrays. Referring to FIG. 7, the system comprises a plurality of subarrays 701a, . . . , 701p. Each subarray can comprise a plurality of antenna elements 115a, . . . , 115n; a plurality of T/R modules 119a, . . . , 119n, and a plurality of analog to digital converters (ADCs) 703a, . . . , 703n. Without any loss of generality, a T/R module 119a and an analog to digital converter (ADC) 703a can be considered to constitute a signal conditioning unit similar to the signal conditioning unit 201a. The output from the plurality of analog to digital converters (ADCs) 703a, . . . , 703n is processed by a digital beamforming unit 705a. The system depicted in FIG. 7 comprises a plurality of digital beamforming unit 705a, . . . 705k. The number of digital beamforming units is lesser than the total number of antenna elements in the system which is equal to n×p. The output from the plurality of digital beamforming unit 705a, . . . 705k is further input to the central processing system 113 which further processes the signal received by the antenna array.

The system depicted in FIG. 7, utilizes adaptive digital beamforming which offers multiple advantages over the traditional analog beamformer approaches. One advantage is that virtual subarrays can be dynamically synthesized to support multi-function or simultaneous modes. Another advantage is that the number of beams can be scaled up and down to meet mission objectives and to address dynamic conditions such as, for example, interference, threat emitters, etc. The number of output beams can be scaled with I/Q sampling rates to maximize usage of available beam-bandwidth product. Virtual Subarrays can be dynamically retasked to support multiple functions (ESM and Radar). Furthermore, beam-bandwidth product can be reallocated on the fly based on sensor observations, Advanced beamforming techniques leverage principal component analysis (PCA) as an unsupervised machine learning algorithm to enable the distributed processors to efficiently utilize system beam-bandwidth product. Traditional systems will pre-configure all the subarrays and define all non-adaptive beams ahead of time, assuming a worst-case scenario. This wastes resources by sending unnecessary, redundant data when the worst case is not encountered. Instead, the novel, distributed processing architecture depicted in FIG. 2 and FIG. 7 perform adaptive dimensionality reduction which dynamically adjusts the virtual subarray configurations and forms the minimal set of adaptive beams. This frees up compute resources allowing the system to perform to multiple simultaneous functions.

Current approaches and algorithms for adaptive array signal processing utilize a centralized processing architecture. Inputs to central processing system can be either (i) digitized outputs from each element (fully digital approach); or (ii) digitized outputs from an analog beamformers operating on subarrays (subarray approach). The fully digital approach doesn't scale well to large arrays. Moreover, beam bandwidth product to central processing systems increases as the array size grows. Furthermore, the processing algorithm complexity scales as $O(N^3)$, where N is number of elements. The analog subarray approach allows for scaling to large arrays but with potential degraded performance. Moreover, analog beamforming has limited reconfigurability and ability to scale beam-bandwidth products and beam parameters. Lack of adaptivity can result in inefficient utilization of available system resources in analog beamforming approach. The distributed processing system depicted in FIG. 2 and FIG. 7 overcomes these deficiencies of the current systems and approaches.

The system depicted in FIG. 2 and FIG. 7 employs fully digital distributed processing approach. The fully digital distributed processing approach enables software defined dimensionality reduction that allows a system to scale to large arrays while retaining the benefits of additional antenna elements. In this architecture each element is digitized, and the output from the groups of elements are sent to distributed processors. At the distributed processors, digital beamformers learn optimal beamforming parameters and create a small number of adaptive beams that captures relevant information needed by the central processing system 113. These adaptive beams are then forwarded to the central processing system 113 where they are further processed to create data products.

Figure 8:
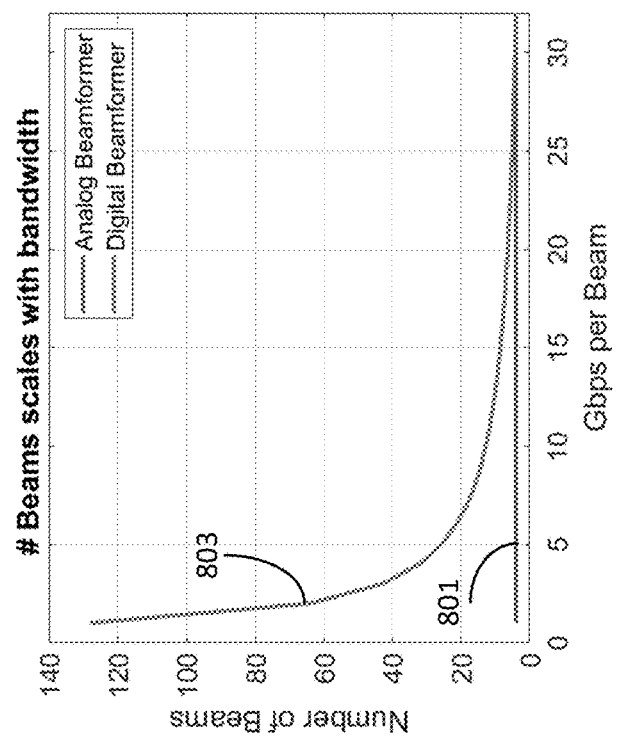
FIG. 8 is a graph showing the scaling of the number of beams for a system employing digital beamforming and analog beamforming respectively.

The adaptive beamforming performed by the distributed processor acts as a dimensionality reduction step allowing fully digital arrays to scale. However, unlike analog beamforming the digital beamforming is data driven and can leverage adaptive processing and machine learning to discover the best representation of the data. For example, the digital beamformers will adaptively steer beams towards discovered signals of interest such as targets or interference sources. As another example, auxiliary beams are adaptively created to maximize interference mitigation performance. As another example, the number of beams can be dynamically scaled up or down to fully maximize utilization of beam-bandwidth product for each function. Without any loss of generality, the beam bandwidth product is equal to the product of the number of beams and the data rate per beam. As yet another example, beam-bandwidth product and virtual subarray tasking can be reallocated on the fly based on current sensor observations enabling improved resource utilization and fast react capability (i.e., Electronic Attack (EA)). In a multi-function system, different modes may require different sampling rates. With a distributed processing architecture, the number of beams to the central processing system 113 can be scaled based on the mode sampling rate as shown in FIG. 8, to maximize beam bandwidth products. This would enable a mode such as ESM to achieve better spatial coverage when less frequency coverage is desired.

FIG. 8 depicts the scaling of the number of beams with bandwidth. As noted from curve 801, analog beamforming is unable to scale the number of beams whereas curve 803 shows that the digital beam forming is able to scale the number of beams with bandwidth to maximize beam bandwidth product. Accordingly, more beams can be utilized for lower bandwidth modes in systems employing digital beamforming. Furthermore, beams can be reallocated on the fly to other functions to address dynamic conditions. This is discussed in greater detail with reference to FIG. 9.

Figure 9:
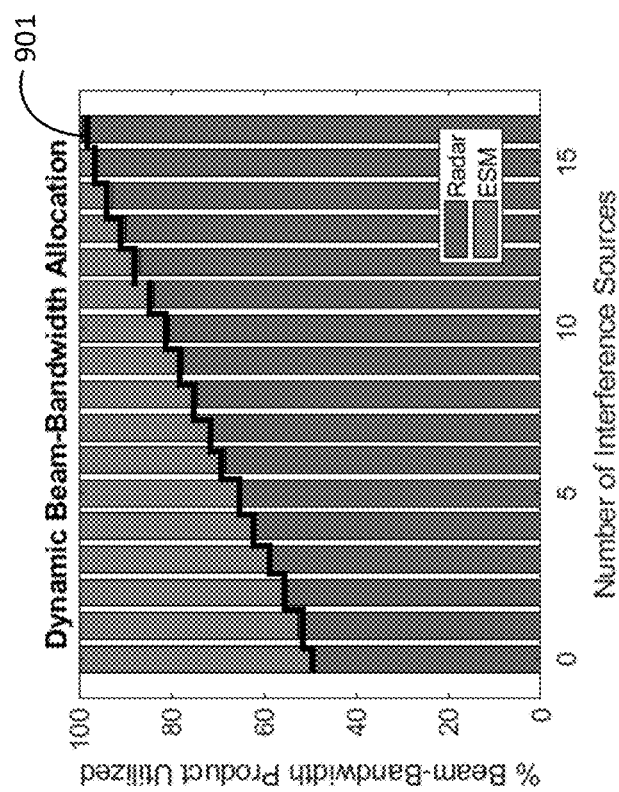
FIG. 9 is a graph showing the variation of the beam-bandwidth product with number of interference sources.

Adaptive digital beamforming also enables the distributed processor to dynamically manage beam-bandwidth allocation across functions. For example, in a radar application this allows the number of beams and sampling rates to be scaled up or down based on current measurements such as the number of interference sources. If a function such as radar only requires a small beam-bandwidth product, then the remaining beam-bandwidth can be repurposed for ESM by the distributed processor. Referring to FIG. 9, the region below the staircase 901 depicts the resources assigned to the primary function (e.g., radar) and the region above the staircase 901 depicts the resources assigned to other functions (e.g., ESM). Based on the number of interference sources in the environment, the system resources can be dynamically allocated to the primary function or support other functions in addition to the primary function.

For radar applications, the distributed processing boards (e.g., 203a, . . . , 203k of FIG. 2 or 705a, . . . , 705k of FIG. 7) needs to provide a sufficient number of beams to the central processing system 113 to mitigate interference and detect targets. Two types of beams are commonly used—(i) Target Beams: These beams are focused on angles where targets may be present. For radar applications they are typically centered around transmit beam; (ii) Auxiliary Beams: Beams designed to capture interference returns, which are useful for interference mitigation at the centralized processor. They are typically directed at sources of interference and nearly orthogonal to the target beams. Without any loss of generality, auxiliary beams can be computed adaptively or non-adaptively. Adaptive approaches to auxiliary beam synthesis are preferred since the interference energy can be captured more efficiently with fewer beams while reducing non-relevant or redundant information.

One approach to adaptive aux beam formation is to leverage principal component analysis (PCA) as an unsupervised machine learning technique. PCA is a dimensionality reduction technique that learns a linear projection to map a high dimensional data set onto a lower-dimensional subspace such that the maximal amount of energy is preserved. The basis vectors for this lower-dimensional subspace are called principal components. Implementation of PCA involves performing an eigen-analysis of the spatial covariance matrix and selecting the dominant eigenvectors as the principal components. Setting the auxiliary beam weights to the principal components results in auxiliary-beams that maximize signal capture from the interference sources. Auxiliary beams created in this way are referred to as eigen-beams. Eigen-beam formation in the distributed processors improves interference mitigation performance vs non-adaptive approaches with more judicious resource utilization. Preliminary studies indicate that in the eigen-beam approach to auxiliary beam formation, the required number of auxiliary eigen-beams scaled nearly linearly with the number of interference sources. Thus, the central processing system 113 may eventually become overwhelmed with data from eigen-beams as the number of interference sources grow. To address scenarios with many interference sources, alternative approaches to eigen-beams may be necessary.

Figure 10:
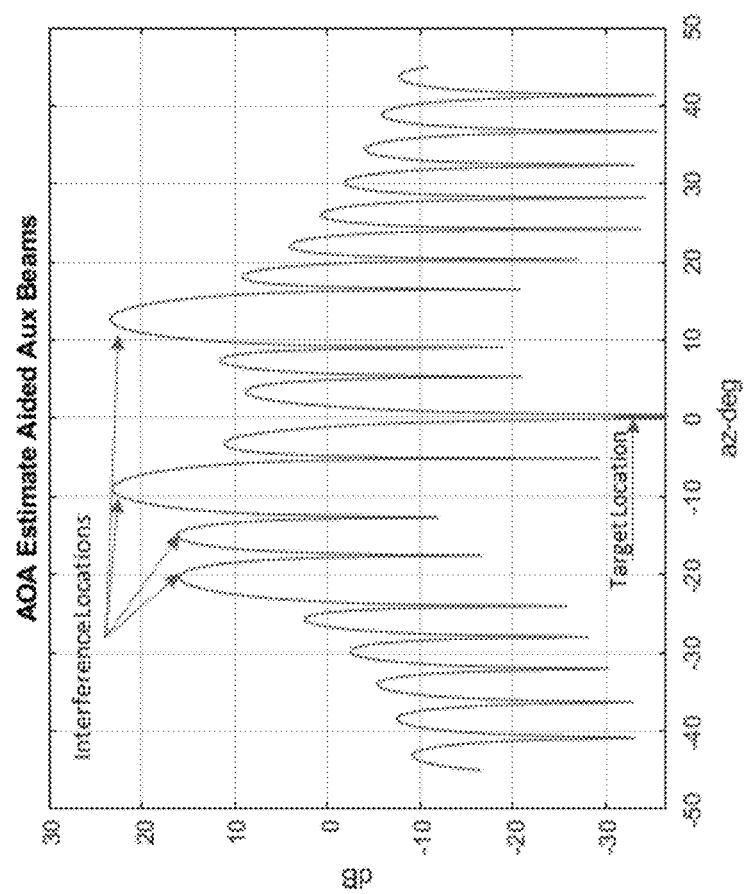
FIG. 10 is a graph illustrating auxiliary beam inferred by a distributed processing system using angle of arrival (AOA) estimates.

One alternative approach to the eigen-beam approach for auxiliary beam formation involves estimating angle of arrival (AOA) of the interference sources to enable each distributed processor to infer what other distributed processors observe. This allows a distributed processor to estimate the full spatial covariance matrix of the entire array and to also infer optimal weights for a single auxiliary beam. The auxiliary beam synthesized using the AOA approach can simultaneously capture all the interference sources with the appropriate gains and phases for cancellation. FIG. 10 shows the auxiliary beam computed based on estimating angle of arrival (AOA) of the interference sources. The location of the interference sources can be determined from the position of the maxima of the auxiliary beam.

In the AOA approach, the centralized processor only needs to receive 1 auxiliary beam per distributed processor in order to perform mitigation, thereby greatly reducing required data rates for scenarios with many interference sources. Disclosed herein is a Distributed Cognitive Adaptive Array Processing (D-CAAP) that can be implemented by the systems shown in FIGS. 2 and 7 to compute the auxiliary beam. In the D-CAAP approach, the AOA of each interference source is estimated in each distributed processing board (e.g., 203a, . . . , 203k of FIG. 2 or 705a, . . . , 705k of FIG. 7). This information is used to infer the full array spatial covariance. With the inferred covariance each distributed processor can estimate the fully adaptive beamforming weights. Each distributed processing board's portion of the fully adaptive weights can then be utilized to form an auxiliary beam. As used herein, adaptive weights can refer to a set of weights applied to a processing unit to steer the beam in a desired direction while creating an adaptive null(s). Adaptive weights are created by combining the inverse covariance matrix of the interference with the conventional weights. Without any loss of generality, conventional weights can refer to a set of weights applied to a processing unit to steer the beam in a desired direction. Conventional weights are created by combining a steering vector with the H matrix. A fewer number of beams are required to compute the auxiliary beam using the D-CAAP approach as compared to eigen-beam approach. The AOA approach has greater SINR than the eigen-beam approach indicating that the performance of the AOA approach is better than the eigen-beam approach while requiring fewer beams.

Figure 11:
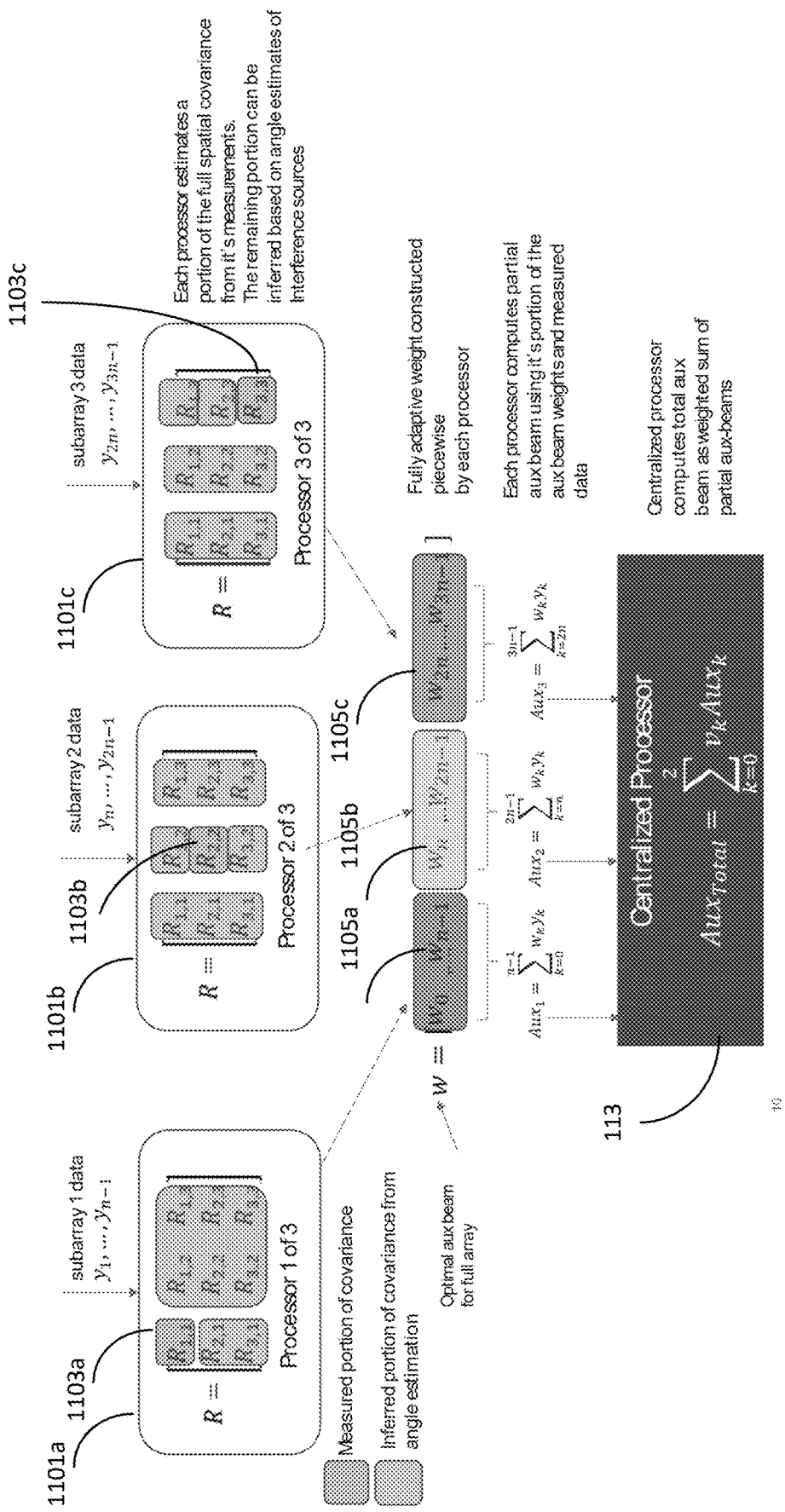
FIG. 11 illustrates a method of implementing distributed cognitive adaptive array processing (D-CAAP) approach in a system comprising three distributed processors.

FIG. 11 illustrates a method of implementing distributed cognitive adaptive array processing (D-CAAP) approach in a system comprising three distributed processing boards 1101a, 1101b, and 1101c (e.g., 203a, . . . , 203k of FIG. 2 or 705a, . . . , 705k of FIG. 7). Each distributed processing board 1101a, 1101b, and 1101c estimates a measured portion (e.g., 1103a, 1103b, 1103c) of the full spatial covariance matrix from the corresponding input subarray data. The remaining portion of the full spatial covariance matrix is inferred based on angle of arrival estimates of the interference sources. A fully adaptive auxiliary beam weight is constructed piecewise by each distributed processing board 1101a, 1101b, and 1101c. Each distributed processing board 1101a, 1101b, and 1101c computes partial auxiliary beam using its portion of the auxiliary beam weights (e.g., 1105a, 1105b, and 1105c). The central processing system 113 computes total auxiliary beam as weighted sum of partial auxiliary beams.

The detailed method to calculate auxiliary beam using the AOA approach is described as follows. In the $j^{th}$ distributed processor the spatial covariance matrix $R_{local}(j)$ between local receive elements is computed using locally available data. Utilizing, $R_{local}(j)$ the determine number of interference sources is determined using PCA. Using a sub-space angle estimation approach such as MUSIC, the angle and SNR of each interference source is estimated. Denote the azimuth and elevation angle estimates for the $i^{th}$ interference source as, $(\theta_i, \phi_i)$, and SNR as $SNR_i$. Denote M as number of interference sources. Using the angle and the SNR estimates along with the array steering vector function the total covariance matrix $R_{total}(j)$ is estimated using equation (3) below. In equation (3), $\bar{s}(\theta_i, \phi_i)$ is the N×1 steering vector for the entire array, where N is the number of elements in the entire array.

$$R_{total}(j) = \sum_{i=0}^{M-1} SNR_i \bar{s}(\theta_i, \phi_i)\bar{s}(\theta_i, \phi_i)^H + I \qquad (3)$$

In the $j^{th}$ distributed processor, matrix A of steering vectors for each interference source is computed using equation (4).

$$A=[s(\theta_0,\phi_0) \ldots s(\theta_{M-1},\phi_{M-1})] \qquad (4)$$

For a desired target angle $(\theta_{tgt}, \phi_{tgt})$ a new matrix B is computed by projecting each column of A onto a sub-space orthogonal to $\bar{s}(\theta_{tgt}, \phi_{tgt})$. The estimated total auxiliary weights is computed using equation (5)

$$W=B(B^H RB)^{-1}B^H R\bar{s}(\theta_{tgt},\phi_{tgt}) \qquad (5)$$

The auxiliary beam is calculated using equation (6). In equation (6), $I_j$ are the elements belonging to the $j^{th}$ processor.

$$\text{AuxBeam}(j)=\Sigma_{m\in I_j} w^*_m y_m \qquad (6)$$

In various embodiments, to save computation the covariance matrix $R_{total}(j)$ need not be directly computed. Instead only $B^H RB$ and $B^H R\bar{s}$ can be calculated.

Figure 12:
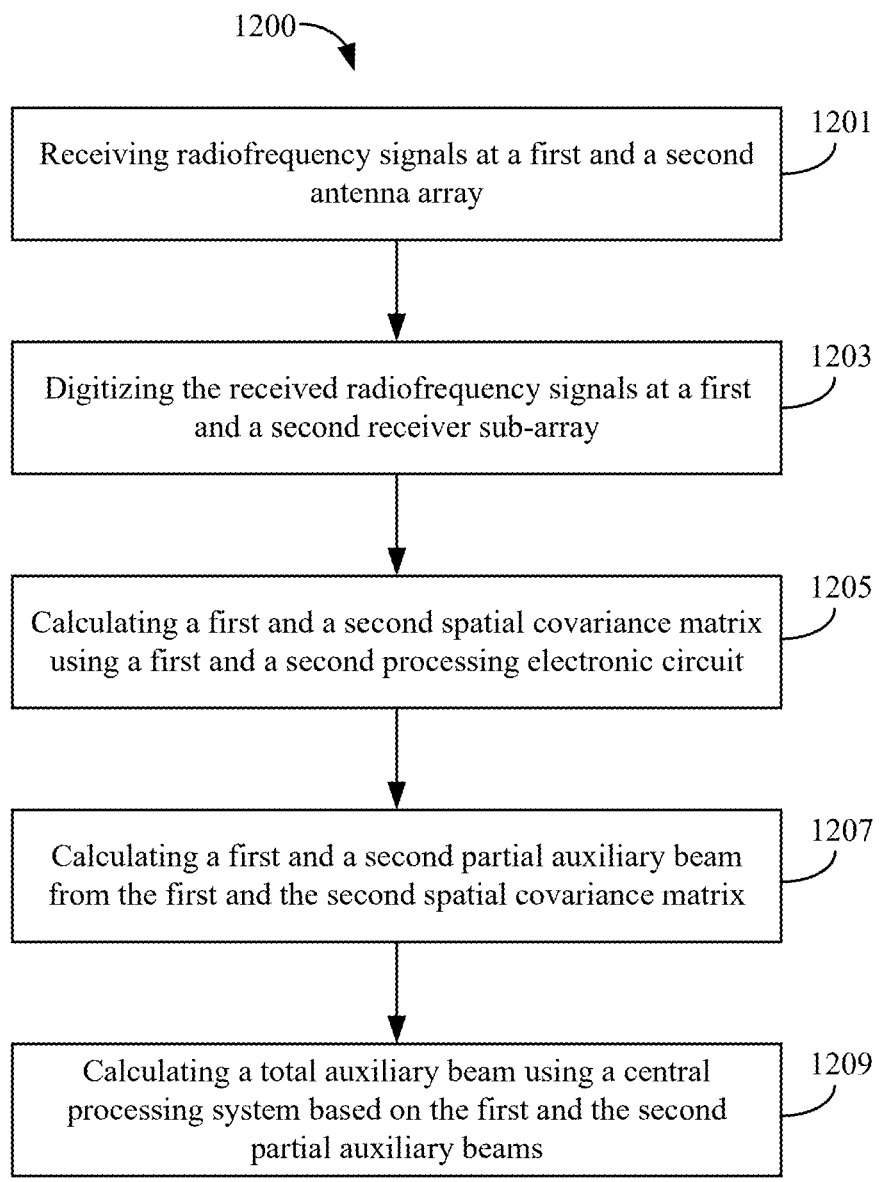
FIG. 12 is a flowchart illustrating a method of processing radiofrequency signals received at an electronic receiver.

FIG. 12 is a flowchart 1200 illustrating a method of processing radiofrequency (RF) signals received at an electronic receiver array. The method comprises receiving radiofrequency signals at a first and a second antenna array, as shown in block 1201. The method further comprises digitizing the received radiofrequency signals at a first and a second receiver sub-array, as shown in block 1203. The method further comprises calculating a first and a second spatial covariance matrix using a first and a second processing electronic circuit, as shown in block 1205. In various embodiments, the first and the second spatial covariance matrix can comprise a measured portion based on the RF signals received at the first and the second receiver sub-array and an inferred portion determined based on an estimate of the angle of arrival of signals from one or more interference sources. The method further comprises calculating a first and a second partial auxiliary beam from the first and the second spatial covariance matrix, as shown in block 1207. In various embodiments, the first and a second partial auxiliary beam is calculated based on a first and a second auxiliary beam weight determined by the first and the second processing electronic circuits respectively. The method 1200 further comprises calculating a total auxiliary beam using a central processing system based on the first and the second partial auxiliary beams, as shown in block 1209. In various embodiments, the total auxiliary beam can be a weighted sum of the first and the second partial auxiliary beams.

Additional illustrations as included in Appendix A.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes disclosed and/or illustrated may differ from those shown in the figures. Depending on the embodiment, certain of the steps described above may be removed, others may be added. For example, the actual steps and/or order of steps taken in the disclosed processes may differ from those described and/or shown in the figure. Depending on the embodiment, certain of the steps described above may be removed, others may be added. For instance, the various components illustrated in the figures and/or described may be implemented as software and/or firmware on a processor, controller, ASIC, FPGA, and/or dedicated hardware. Furthermore, the features and attributes of the specific embodiments disclosed above may be combined in different ways to form additional embodiments, all of which fall within the scope of the present disclosure.

In some cases, there is provided a non-transitory computer readable medium storing instructions, which when executed by at least one computing or processing device, cause performing any of the methods as generally shown or described herein and equivalents thereof.

Any of the memory components described herein can include volatile memory, such random access memory (RAM), dynamic random access memory (DRAM), synchronous dynamic random access memory (SDRAM), double data rate (DDR) memory, static random access memory (SRAM), other volatile memory, or any combination thereof. Any of the memory components described herein can include non-volatile memory, such as magnetic storage, flash integrated circuits, read only memory (ROM), Chalcogenide random access memory (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

Any user interface screens illustrated and described herein can include additional and/or alternative components. These components can include menus, lists, buttons, text boxes, labels, radio buttons, scroll bars, sliders, checkboxes, combo boxes, status bars, dialog boxes, windows, and the like. User interface screens can include additional and/or alternative information. Components can be arranged, grouped, displayed in any suitable order.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, or within less than 0.01% of the stated amount.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

The foregoing description, for purposes of explanation, used specific nomenclature to provide a thorough understanding of the disclosure. However, it will be apparent to one skilled in the art that specific details are not required in order to practice the disclosed embodiments. Thus, the foregoing descriptions of specific embodiments are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications, they thereby enable others skilled in the art to best utilize the disclosure and various embodiments with various modifications as are suited to the particular use contemplated. It is intended that the claims as presented herein or as presented in the future and their equivalents define the scope of the protection.

What is claimed is:

1. A phased array system comprising:
a plurality of sub-arrays of transceivers each sub-array comprising a plurality of transmitters and receivers;
a plurality of processing electronics circuits configured to process one or more signals received by the plurality of sub-arrays of transceivers; and
a central processing system in communication with the plurality of processing electronics circuits,
wherein a first processing electronics circuit of the plurality of processing electronics circuits is configured to generate a first spatial covariance matrix, the first spatial covariance matrix comprising a measured portion calculated using signals received from a first sub-array of transceivers of the plurality of sub-arrays of transceivers and an inferred portion calculated using estimates of angle of arrival of signals from one or more interference sources, the first processing electronics circuit further configured to compute a first auxiliary beam weight and calculate a first partial auxiliary beam based on the signals received from the first sub-array and the first auxiliary beam weight,
wherein a second processing electronics circuit of the plurality of processing electronics circuits is configured to generate a second spatial covariance matrix, the second spatial covariance matrix comprising a measured portion calculated using signals received from a second sub-array of transceivers of the plurality of sub-arrays of transceivers and an inferred portion calculated using estimates of angle of arrival of signals from the one or more interference sources, the second processing electronics circuit further configured to compute a second auxiliary beam weight and calculate a second partial auxiliary beam based on the signals received from the second sub-array and the second auxiliary beam weight, and
wherein the central processing system is configured to calculate a total auxiliary beam for the phased array system from the first partial auxiliary beam and the second partial auxiliary beam.

2. The phased array system of claim 1, wherein the first and second processing electronics circuits are configured to share data between each other.

3. The phased array system of claim 1, wherein the plurality of processing electronics circuits comprise a field programmable gate array (FPGA) or an application specific integrated circuit (ASIC).

4. The phased array system of claim 1, wherein the central processing system comprises an electronic central processing unit (CPU) or an electronic graphics processing unit (GPU).

5. The phased array system of claim 1, wherein a size of the first sub-array or a size of the second sub-array is variable and dynamically determined.

6. The phased array system of claim 1, wherein the total auxiliary beam comprises information regarding location of the one or more interference sources.

7. An electronic receiver array comprising:
a plurality of sub-arrays of receiving electronics each sub-array configured to receive radiofrequency (RF) signals from an antenna array of a plurality of antenna arrays and digitize the received RF signals;
a plurality of processing electronics circuits each configured to process signals output from a sub-array of the plurality of sub-arrays; and
a central processing system in communication with the plurality of processing electronics circuits,
wherein a first processing electronics circuit of the plurality of processing electronics circuits is configured to generate a first spatial covariance matrix, the first received from a first sub-array of the plurality of sub-arrays and an inferred portion calculated using estimates of angle of arrival of signals from the one or more interference sources, the first processing electronics circuit further configured to compute a first auxiliary beam weight and calculate a first partial auxiliary beam based on the signals received from the first sub-array and the first auxiliary beam weight,
wherein a second processing electronics circuit of the plurality of processing electronics circuits is configured to generate a second spatial covariance matrix, the second spatial covariance matrix comprising a measured portion calculated using signals received from a second sub-array of the plurality of sub-arrays and an inferred portion calculated using estimates of angle of arrival of signals from the one or more interference sources, the second processing electronics circuit further configured to compute a second auxiliary beam weight and calculate a second partial auxiliary beam based on the signals received from the second sub-array and the second auxiliary beam weight, and
wherein the central processing system is configured to calculate a total auxiliary beam for the electronic receiver array from the first partial auxiliary beam and the second partial auxiliary beam.

8. The electronic receiver array of claim 7, wherein the first and second partial auxiliary beams are calculated using principal component analysis.

9. The electronic receiver array of claim 7, wherein the angle of arrival of signals from the one or more interference sources is obtained using a sub-space angle estimation approach.

10. The electronic receiver array of claim 7, wherein the inferred portion comprises a signal to noise ratio for the one or more interference sources.

11. A method of processing signals received by an electronic receiver array, the method comprising:
receiving radiofrequency (RF) signals at a plurality of antenna arrays each comprising a plurality of antenna elements;
digitizing the received RF signals at a plurality of receiver sub-arrays each comprising a plurality of electronic receivers;
calculating a first spatial covariance matrix using a first processing electronics circuit configured to process the signals output from a first receiver sub-array of the plurality of receiver sub-arrays;
calculating a first partial auxiliary beam based on the first spatial covariance matrix using the first processing electronics circuit;
calculating a second spatial covariance matrix using a second processing electronics circuit configured to process the signals output from a second receiver sub-array of the plurality of receiver sub-arrays;

calculating a second partial auxiliary beam based on the second spatial covariance matrix using the second processing electronics circuit; and calculating a total auxiliary beam for the electronic receiver array from the first partial auxiliary beam and the second partial auxiliary beam using a central processing system in communication with the first and second processing electronics circuits.

12. The method of claim 11, wherein calculating the first spatial covariance matrix comprises calculating a measured portion using signals received from the first receiver sub-array and calculating an inferred portion using estimates of angle of arrival of signals from one or more interference sources.

13. The method of claim 11, wherein calculating the second spatial covariance matrix comprises calculating a measured portion using signals received from the second receiver sub-array and calculating an inferred portion using estimates of angle of arrival of signals from one or more interference sources.

14. The method of claim 11, wherein calculating the first partial auxiliary beam comprises computing a first auxiliary beam weight using the first processing electronics circuit and calculating the first partial auxiliary beam based on the signals received from the first receiver sub-array and the first auxiliary beam weight.

15. The method of claim 11, wherein calculating the second partial auxiliary beam comprises computing a second auxiliary beam weight using the second processing electronics circuit and calculating the second partial auxiliary beam based on the signals received from the second receiver sub-array and the second auxiliary beam weight.

* * * * *